W. C. PETTIJOHN.
Filter.
No. 133,720.                                    Patented Dec. 10, 1872.
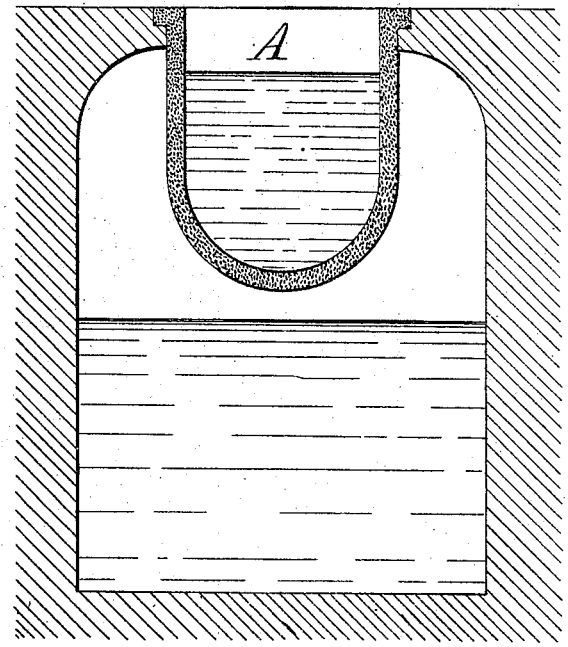
WITNESSES:                    INVENTOR:
Robert Burns                  Wm. C. Pettijohn
Ch. Rousseau                  per Berthel & Co
                                   Attys.

UNITED STATES PATENT OFFICE.

WILLIAM C. PETTIJOHN, OF OZARK, MISSOURI.

IMPROVEMENT IN FILTERS.

Specification forming part of Letters Patent No. 133,720, dated December 10, 1872.

*To all whom it may concern:*

Be it known that I, WILLIAM C. PETTIJOHN, of Ozark, in the county of Christian and State of Missouri, have invented a certain new and useful Improved Filter; and I do hereby declare the following to be a full and true description thereof, reference being had to the accompanying drawing and to the letters of reference marked thereon.

The object of this invention relates to the formation of an improved filter, cheap and durable in construction, not liable to become choked, and which may be readily cleaned. The nature of this invention consists in the use of solid Tripoli as the medium through which the water or other liquid to be filtered is passed.

The drawing represents a vessel, in section, formed of solid Tripoli as one of the ways in which the same can be used.

The filter, of any suitable form, size, and construction, is provided with a filtering diaphragm or medium of Tripoli.

As shown in the drawing, A represents a Tripoli vessel for the reception of the liquid to be filtered.

The natural formation of Tripoli being peculiarly adapted to allow the water or liquid to percolate and filter in its passage, a most clear, pure, and healthy filtration of the liquid matter is achieved.

As readily apparent the Tripoli is adapted for the use, lining, building, or forming of cisterns, reservoirs, or other receptacles for the filtration of water and liquids for household and similar purposes.

Having thus fully described my said invention, what I claim is—

A filtering medium or vessel of solid Tripoli, as and for the purpose set forth.

In testimony of said invention I have hereunto set my hand.

WILLIAM C. PETTIJOHN.

Witnesses:
WILLIAM W. HERTHEL,
ROBERT BURNS.